J. E. ROWLAND
Wheel Cultivator.

No. 64,576.

Patented May 7, 1867.

Witnesses:
G. E. Breed
H. Browne

Inventor:
John E. Rowland
By Daniel Breed Atty

J. E. ROWLAND
Wheel Cultivator.

Patented May 7, 1867.

Witnesses:
G. E. Breed
A. Bowne

Inventor:
John E. Rowland
By Daniel Breed Atty

United States Patent Office.

JOHN E. ROWLAND, OF HAGERSTOWN, MARYLAND.

Letters Patent No. 64,576, dated May 7, 1867.

CULTIVATORS.

The Schedule referred to in these Letters Patent and making part of the same.

TO ALL WHOM IT MAY CONCERN:

Be it known that I, JOHN E. ROWLAND, of Hagerstown, in the county of Washington, and State of Maryland, have invented a new and useful improvement in Cultivators; and I do hereby declare that the following is a full and exact description thereof, reference being had to the accompanying drawings, and to the letters of reference marked thereon.

My invention consists of a novel construction and arrangement of cultivators. In the accompanying drawings—

Figure 1:
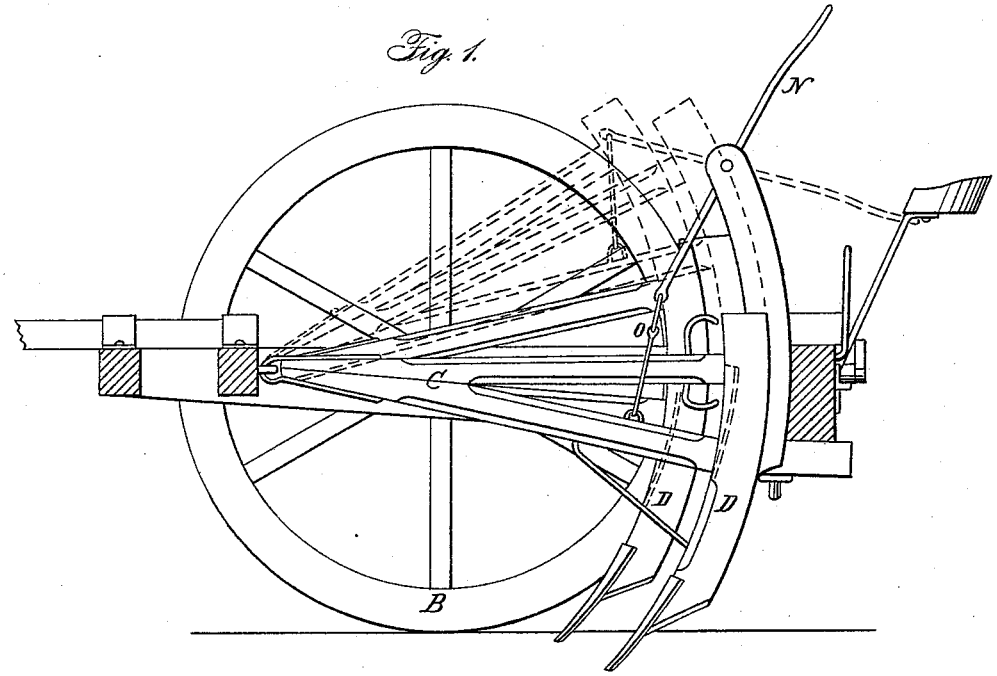
Figure 1 is a longitudinal section of my cultivator.
Figure 2:
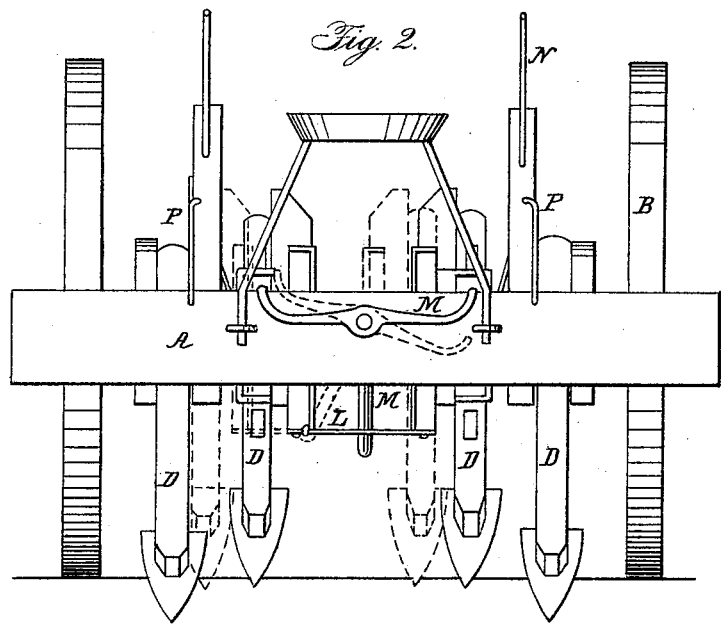
Figure 2 is a rear view of the same.
Figure 3:
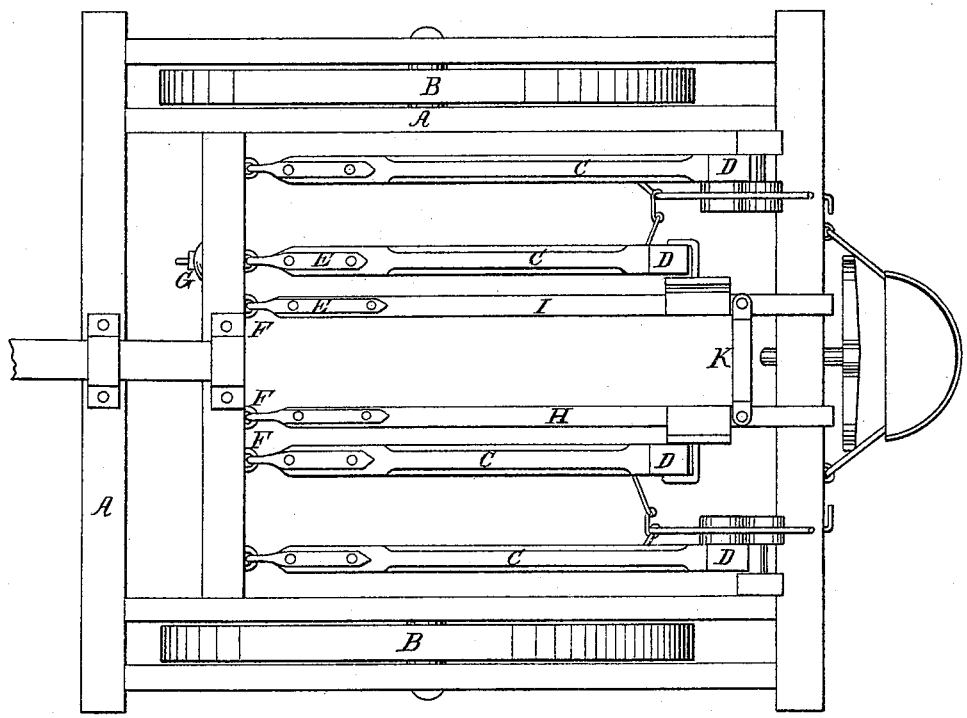
Figure 3 is a top view.

The main frame A of my cultivator is supported on two wheels B, without any axle, so as to ride above tall corn. The drag-bars C are V-shaped, in order to brace and firmly hold the shanks D of the ploughs, and their forward ends are fastened to the main frame by means of double staples E and F, and a screw-nut G, or other suitable means. Two additional V-shaped bars, H and I, extend back so as to clasp the rear-bar of the main frame, and are also connected by a dog, K, and also by an iron strap, L. A stirrup-lever, M, passes through a hole in strap L, and enables the driver to swing these additional bars, and the two middle plough-shanks connected therewith, to the right or left at pleasure, (as seen in red lines, fig. 2,) in order to follow or avoid injuring the row of corn when the team or row deviates from the proper line. Two levers N are arranged in connection with chains O, for elevating the ploughs at pleasure, as indicated in red lines, fig. 1. Two hooks P are employed to fasten the lever N, and thus release the driver's hand when driving from field to field.

Having thus described my invention, what I claim, and desire to secure by Letters Patent of the United States, is—

The above-described cultivator, the beams C, levers N, and stirrup-lever M, being all arranged and combined substantially in the manner and for the purposes set forth.

JOHN E. ROWLAND.

Witnesses:
 LESTER NOBLE,
 LOUISE KRAMER.